United States Patent
Chiproot

(10) Patent No.: US 10,627,024 B2
(45) Date of Patent: Apr. 21, 2020

(54) SEAL FOR RANGE OF PIPE DIAMETERS WITH INTERLOCKING LAYERS

(71) Applicant: Eliezer Krausz Industrial Development Ltd., Tel Aviv (IL)

(72) Inventor: Avi Chiproot, Kfar-Saba (IL)

(73) Assignee: Krausz Industries Ltd., Tel Aviv (IL)

( * ) Notice: Subject to any disclaimer, the term of this patent is extended or adjusted under 35 U.S.C. 154(b) by 134 days.

(21) Appl. No.: 15/610,794

(22) Filed: Jun. 1, 2017

(65) Prior Publication Data
US 2018/0347729 A1    Dec. 6, 2018

(51) Int. Cl.
| | |
|---|---|
| F16L 17/035 | (2006.01) |
| F16L 17/04 | (2006.01) |
| F16L 21/02 | (2006.01) |
| F16L 21/06 | (2006.01) |
| F16L 25/14 | (2006.01) |

(52) U.S. Cl.
CPC ............ *F16L 17/035* (2013.01); *F16L 17/04* (2013.01); *F16L 21/022* (2013.01); *F16L 21/06* (2013.01); *F16L 21/065* (2013.01); *F16L 25/14* (2013.01)

(58) Field of Classification Search
CPC ....... F16L 17/035; F16L 17/04; F16L 21/022; F16L 21/06; F16L 21/065; F16L 25/14; F16L 25/12; F16L 17/02; F16L 19/06; F16L 25/0054
USPC .......... 285/369, 12, 110, 111, 112, 379, 364, 285/109
See application file for complete search history.

(56) References Cited

U.S. PATENT DOCUMENTS

| | | | | |
|---|---|---|---|---|
| 2,780,483 A | * | 2/1957 | Kessler | F16L 19/0218 285/332.3 |
| 2,980,449 A | * | 4/1961 | Dunton | F16L 17/025 277/615 |
| 3,135,519 A | | 6/1964 | Ligon | |
| 3,150,876 A | | 9/1964 | Lafferty | |
| 3,680,894 A | * | 8/1972 | Young | F16L 17/04 277/616 |
| 3,857,589 A | * | 12/1974 | Oostenbrink | F16L 47/10 277/615 |
| 4,303,103 A | * | 12/1981 | Marks | F16L 21/022 285/109 |
| 4,693,483 A | * | 9/1987 | Valls | F16L 47/10 277/624 |
| 4,754,995 A | * | 7/1988 | Takahashi | B21D 17/04 285/353 |

(Continued)

FOREIGN PATENT DOCUMENTS

WO    2015/145377    10/2015

OTHER PUBLICATIONS

PCT Search Report and Written Opinion, PCT/IB2018/053857, dated Sep. 25, 2018.

*Primary Examiner* — Anna M Momper
*Assistant Examiner* — William S. Choi
(74) *Attorney, Agent, or Firm* — Dekel Patent Ltd.; David Klein

(57) ABSTRACT

A pipe coupling includes a clamp housing and a seal assembly mounted in at least one end of the clamp housing. The seal assembly includes an outer sealing layer connected to an inner sealing layer with interlocking mating structures that abut against each other in radial and axial directions and prevent the inner and outer sealing layers from separating from each other in the radial and axial directions.

9 Claims, 2 Drawing Sheets

(56) References Cited

U.S. PATENT DOCUMENTS

| | | | | |
|---|---|---|---|---|
| 5,249,829 A * | 10/1993 | Hendrickson | | F16L 17/04 285/112 |
| 5,351,999 A * | 10/1994 | Hattori | | F16L 25/065 285/369 |
| 5,941,576 A * | 8/1999 | Krausz | | F16L 17/04 285/110 |
| 5,997,006 A * | 12/1999 | Westhoff | | F16L 5/02 277/604 |
| 6,293,556 B1 * | 9/2001 | Krausz | | F16L 17/04 277/549 |
| 7,140,618 B2 * | 11/2006 | Valls, Jr. | | F16L 21/03 277/609 |
| 7,243,955 B2 * | 7/2007 | Krausz | | F16L 21/08 285/111 |
| 7,571,940 B2 * | 8/2009 | Krausz | | F16L 21/022 285/323 |
| 7,625,018 B2 * | 12/2009 | Krausz | | F16L 55/172 285/367 |
| 7,654,586 B2 * | 2/2010 | Krausz | | F16L 17/04 285/111 |
| 7,997,626 B2 * | 8/2011 | Krausz | | F16L 21/022 285/110 |
| 8,038,176 B2 * | 10/2011 | Bowman | | F16L 17/04 285/112 |
| 8,282,136 B2 * | 10/2012 | Vandal | | F16L 17/04 285/112 |
| 8,776,351 B2 * | 7/2014 | Bird | | F16L 21/022 277/603 |
| 9,310,002 B2 * | 4/2016 | Chiproot | | F16L 17/035 |
| 9,816,649 B2 * | 11/2017 | Chiproot | | F16L 25/065 |
| 2004/0195827 A1 * | 10/2004 | Olsson | | F16L 17/063 285/110 |
| 2012/0299293 A1 * | 11/2012 | Chiproot | | F16L 21/022 285/337 |
| 2013/0193685 A1 * | 8/2013 | Bird | | F16L 21/04 285/337 |
| 2016/0281345 A1 * | 9/2016 | Miller | | F16L 25/14 |
| 2017/0059070 A1 | 3/2017 | Chiproot | | |

* cited by examiner

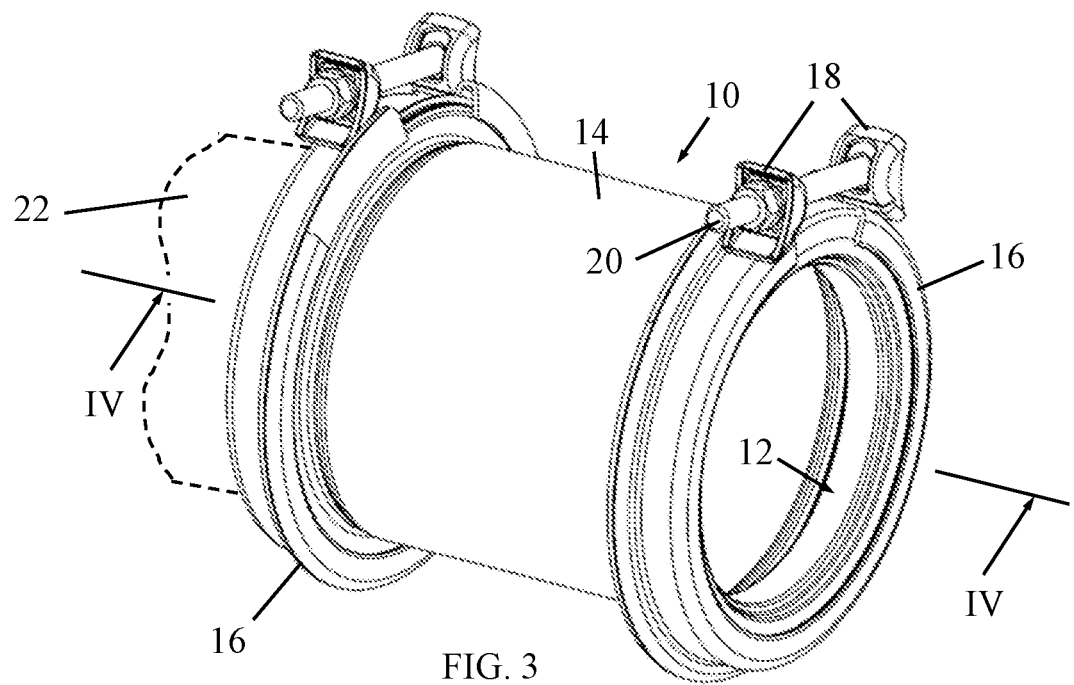
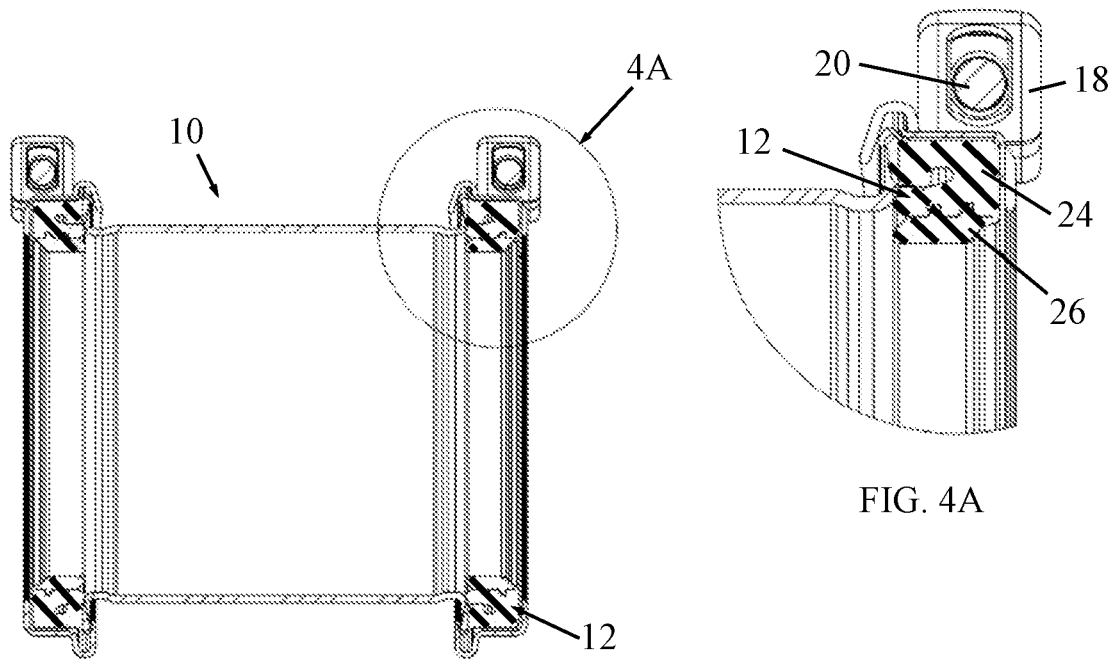

SEAL FOR RANGE OF PIPE DIAMETERS WITH INTERLOCKING LAYERS

FIELD OF THE INVENTION

The present invention relates generally to couplings (or clamps) for pipes, and particularly to a seal for a coupling adaptable for a range of pipe diameters, having sealing layers that are interlocked with each other.

BACKGROUND OF THE INVENTION

Many kinds of removable band-type couplings for pipes exist in the art. It is noted that throughout the specification and claims, the term "pipe" encompasses any kind of generally cylindrical object.

Such couplings have an elastomeric seal assembly which is tightened to form a watertight seal against the pipe. Couplings are known that can be used for a range of pipe diameters. Generally, such seal assemblies have two layers of gaskets (seals), for example, constructed of a first ring seal seated over a second ring seal. The seals can be easily disconnected from one another to allow sealing against different diameter pipes. For smaller diameter pipes, both the first and second ring seals are used; for larger diameters, only one seal is used.

A prior art seal 1 of this type is shown in FIG. 1. Seal 1 includes an outer sealing layer 2 connected to an inner sealing layer 3 with mating portions that include annular ridges 4 that are received in annular grooves 5. The annular ridges 4 and annular grooves 5 have a trapezoidal or triangular cross-section. There is a mating clearance between annular ridges 4 and annular grooves 5 to facilitate mating the two portions together. It has been found that such a mating structure has limited ability to withstand forces due to fluid pressures in the assembled coupling with liquid flowing through the coupling. The fluid pressures can cause the two sealing layers 2 and 3 to separate from one another (in the radial directions of arrows 6 and 7), and/or in the axial direction (arrow 8) along the slant of the trapezoidal or triangular surface, at different circumferential portions of the sealing layers.

SUMMARY OF THE INVENTION

The present invention seeks to provide an improved seal assembly, as is described more in detail hereinbelow. Unlike the prior art, the seal assembly of the present invention has inner and outer sealing layers that mate together with interlocking structure that prevents the two sealing layers from separating from each other axially and radially, even in the presence of forces during usage of the coupling.

There is thus provided in accordance with an embodiment of the present invention a pipe coupling including a clamp housing including at least one end having two opposing clamp members and one or more tightening elements for tightening the clamp members towards each other in a direction transverse to an axial length of the clamp housing so as to apply a radially-inward clamping force on a pipe being clamped in the clamp housing, and a seal assembly mounted in the at least one end of the clamp housing, wherein the seal assembly includes an outer sealing layer connected to an inner sealing layer with interlocking mating structures that abut against each other in axial and radial directions and prevent the inner and outer sealing layers from separating from each other in the axial and radial directions.

In accordance with an embodiment of the present invention the interlocking mating structures include an at least partially annular lug that protrudes from one of the sealing layers and is received in an at least partially annular channel formed in the other sealing layer.

In accordance with an embodiment of the present invention the lug includes first and second faces and is formed with a notch formed at a junction of a slanted face and a bulbous protrusion of the lug.

In accordance with an embodiment of the present invention the first and second faces are orthogonal to each other.

In accordance with an embodiment of the present invention the second face is parallel to a pipe interface surface and to a contact surface of the inner sealing layer, the contact surface being in contact with the outer sealing layer.

In accordance with an embodiment of the present invention the slanted face is opposite to the first face and is slanted with respect to the second face.

In accordance with an embodiment of the present invention the channel of the outer sealing layer is formed with a ridge that fits into the notch.

In accordance with an embodiment of the present invention the bulbous protrusion fits into a complementarily shaped crevice formed in the channel.

BRIEF DESCRIPTION OF THE DRAWINGS

The present invention will be understood and appreciated more fully from the following detailed description, taken in conjunction with the drawing in which:

FIG. 3 is a simplified pictorial illustration of a pipe coupling with the seal assembly of FIG. 2, in accordance with a non-limiting embodiment of the present invention;

FIG. 4 is a simplified sectional illustration of the pipe coupling with the seal assembly, taken along lines IV-IV in FIG. 3; and FIG. 4A is an enlarged sectional illustration of the seal assembly in the pipe coupling.

DETAILED DESCRIPTION OF EMBODIMENTS

Figure 1:
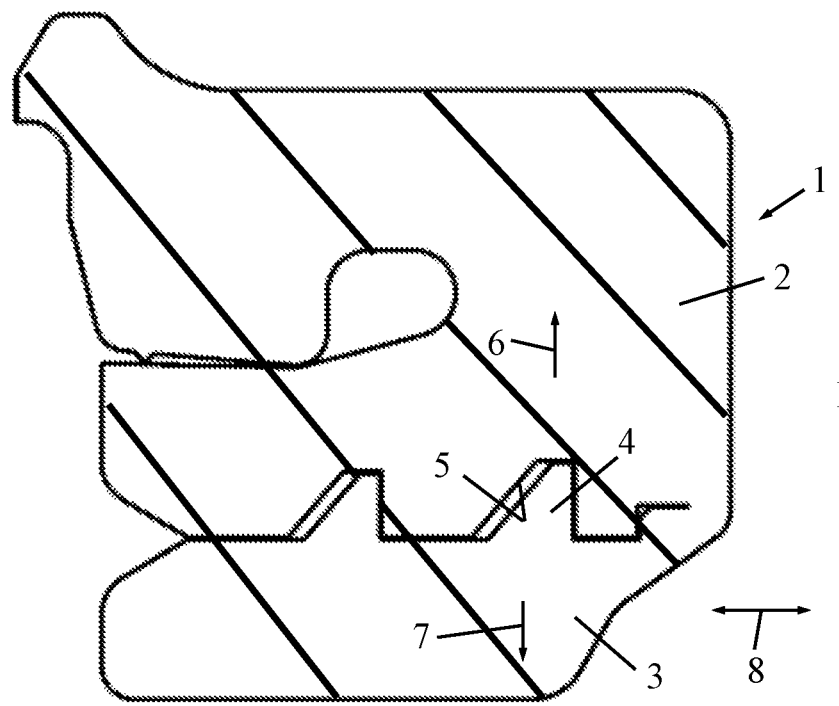
FIG. 1 is a simplified sectional illustration of a prior art seal assembly.

Reference is now made to FIG. 3, which illustrate a pipe coupling 10 with a seal assembly 12, constructed and operative in accordance with a non-limiting embodiment of the present invention.

Pipe coupling 10 includes a clamp housing 14 that has one or more ends 16 (two are shown in the illustrated embodiment). Clamp housing 14 may be cylindrical or partially cylindrical or of any other shape. Each end 16 is provided with two opposing clamp members 18 and one or more tightening elements 20 for tightening the clamp members 18 towards each other in a direction transverse to an axial length of the clamp housing 14 so as to apply a radially-inward clamping force on a pipe 22 (shown partially in broken lines in FIG. 2) being clamped in the clamp housing 14.

Seal assembly 12 may be mounted in end 16 of clamp housing 14. Each seal assembly 12 is an at least partially annular seal, meaning it can be a full 360° sealing ring or it can be a partial ring spanning an angle less than 360°, depending on the particular application.

Figure 2:
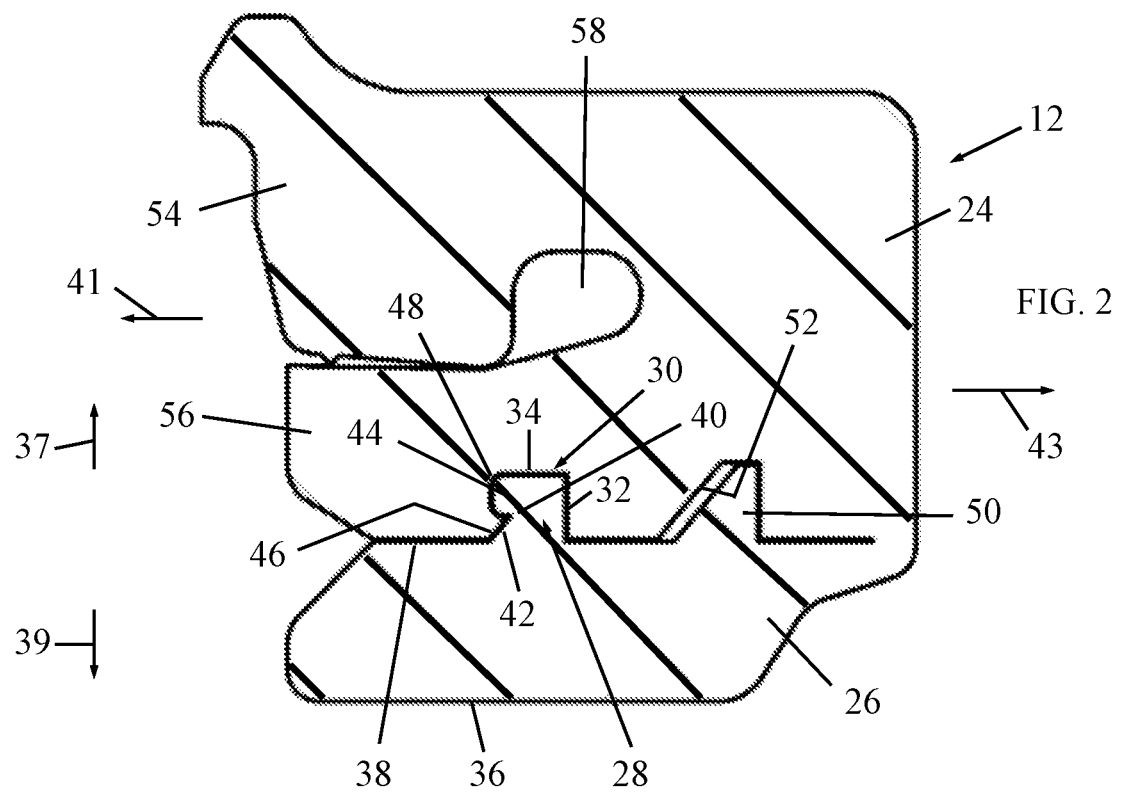
FIG. 2 is a simplified sectional illustration of a seal assembly, constructed and operative in accordance with a non-limiting embodiment of the present invention.

As seen in FIG. 2, seal assembly 12 includes an outer sealing layer 24 connected to an inner sealing layer 26 with at least one interlocking mating structure, such as an at least partially annular lug 28 that protrudes from one of the sealing layers (in the illustrated embodiment it protrudes from the inner sealing layer 26) and is received in an at least partially annular channel 30 formed in the other sealing layer (in the illustrated embodiment it is formed in the outer sealing layer 24). Lug 28 may include first and second (e.g., flat) faces 32 and 34, which are orthogonal to each other. Face 34 may be parallel to a pipe interface surface 36 and to a contact surface 38 of inner sealing layer 26 (contact surface 38 being the surface that contacts the inner portion of outer sealing layer 24). Opposite to first face 32, lug 28 is formed with a notch 40 formed at a junction of a slanted face 42 and a bulbous protrusion 44 of lug 28. Slanted face 42 is slanted with respect to the second face 34 and to the contact surface 38 of inner sealing layer 26.

The channel 30 of outer sealing layer 24 is formed with a ridge 46 that fits into notch 40. The bulbous protrusion 44 of lug 28 fits into a complementarily shaped crevice 48 formed in channel 30 of outer sealing layer 24. The interlocking mating structures (such as the bulbous protrusion 44 of lug 28 abutting against channel 30; the ridge 46 abutting against notch 40 and slanted face 42) abut against each other in the radial and axial directions and prevent the inner and outer sealing layers from separating from each other in the radial and axial directions (indicated by arrows 37 and 39, and 41 and 43, respectively, in FIG. 2), even in the presence of forces during usage of the coupling.

The interlocking mating structures may be provided in more than one place or in just one place. In the illustrated embodiment, the seal assembly includes an at least partially annular ridge 50 is received in an at least partially annular groove 52. Ridge 50 and groove 52 may have a trapezoidal or triangular cross-section.

FIGS. 4 and 4A illustrate pipe coupling 10 with the seal assembly 12 installed therein.

Seal assembly 12, without limitation, may be made of a rubber (e.g., EPDM (ethylene propylene diene monomer), butyl, styrene butadiene or neoprene) or a thermoplastic elastomer (e.g., polyurethane or olefin) compatible with the fluid to be carried in the pipe. For example, without limitation, seal assembly 12 may be made of EPDM rubber with 70-80 Shore A durometer.

The inner sealing layer 26 is used together with the outer sealing layer 24 when clamping a pipe of relatively small diameter. If a relatively large pipe is to be clamped, inner sealing layer 26 may be removed from outer sealing layer 24, such as by simply removing inner sealing layer 26 (if the two layers are not one contiguous piece of elastomer) or by tearing or cutting inner sealing layer 26 (if the two layers are one contiguous piece of elastomer). Alternatively, if the two layers are one contiguous piece of elastomer as in the illustrated embodiment, inner sealing layer 26 may be folded away from outer sealing layer 26 (instead of being torn or cut).

By "one contiguous piece of elastomer" it is meant that the two layers may be extruded or molded as one piece or may be joined to each other, such as by bonding, mechanical fastening or any other suitable method.

Referring again to FIG. 2, outer sealing layer 24 may be constructed with an outer portion 54 folded over an inner portion 56 so as to define at least one inner annular space 58 between and bounded by the inner and outer portions 56 and 54. The inner annular space 58 is in fluid communication with a fluid (e.g., water, not shown) flowing in a pipe sealed by seal assembly 12. The fluid enters inner annular space 58 via one or more apertures (not shown) and applies pressure in inner annular space 58 to increase tightening of the seal.

What is claimed is:

1. A pipe coupling comprising:
a clamp housing comprising at least one end having two opposing clamp members and one or more tightening elements for tightening said clamp members towards each other in a direction transverse to an axial length of said clamp housing so as to apply a radially-inward clamping force on a pipe being clamped in said clamp housing; and
a seal assembly mounted in said at least one end of said clamp housing;
wherein said seal assembly comprises an outer sealing layer connected to an inner sealing layer with interlocking mating structures that abut against each other in radial and axial directions and prevent said inner and outer sealing layers from separating from each other in the radial and axial directions, wherein said interlocking mating structures comprise an at least partially annular lug that protrudes from one of said sealing layers and is received in an at least partially annular channel formed in the other sealing layer, and wherein said at least partially annular lug comprises first and second faces and is formed with a notch formed at a junction of a slanted face and a bulbous protrusion of said lug, and said slanted face extends at a slanted angle radially outwards from a contact surface of said inner sealing layer, said contact surface contacting an inner portion of said outer sealing layer, and said a bulbous portion bulges axially from said notch.

2. The pipe coupling according to claim 1, wherein said bulbous protrusion radially overlies said slanted face.

3. The pipe coupling according to claim 1, wherein said first and second faces are orthogonal to each other.

4. The pipe coupling according to claim 1, wherein said second face is parallel to a pipe interface surface and to a contact surface of said inner sealing layer, said contact surface being in contact with said outer sealing layer.

5. The pipe coupling according to claim 1, wherein said slanted face is opposite to said first face and is slanted with respect to said second face.

6. The pipe coupling according to claim 1, wherein said channel of said outer sealing layer is formed with a ridge that fits into said notch.

7. The pipe coupling according to claim 1, wherein said bulbous protrusion fits into a complementarily shaped crevice formed in said channel.

8. The pipe coupling according to claim 1, wherein said inner and outer sealing layers are constructed as one contiguous piece of an elastomer.

9. The pipe coupling according to claim 1, wherein said inner and outer sealing layers are not constructed as one contiguous piece of an elastomer.

* * * * *